US012634478B2

(12) United States Patent
Fang et al.

(10) Patent No.: US 12,634,478 B2
(45) Date of Patent: May 19, 2026

(54) AUDIOVIDEO INTERACTION LOW-DELAY TRANSMISSION METHOD AND BACKGROUND SERVER

(71) Applicant: Guangdong Baolun Electronics Co., Ltd., Guangzhou (CN)

(72) Inventors: Hongshen Fang, Guangzhou (CN); Changlv Li, Guangzhou (CN); Changhua Zhang, Guangzhou (CN); Zhenghui Zhu, Guangzhou (CN); Dingjin Zhao, Guangzhou (CN)

(73) Assignee: Guangdong Baolun Electronics Co., Ltd., Guangzhou (CN)

( * ) Notice: Subject to any disclaimer, the term of this patent is extended or adjusted under 35 U.S.C. 154(b) by 85 days.

(21) Appl. No.: 18/673,657

(22) Filed: May 24, 2024

(65) Prior Publication Data

US 2024/0314332 A1 Sep. 19, 2024

Related U.S. Application Data

(63) Continuation of application No. PCT/CN2022/117473, filed on Sep. 7, 2022.

(30) Foreign Application Priority Data

Feb. 24, 2022 (CN) .......................... 202210171600.9

(51) Int. Cl.
*H04N 19/164* (2014.01)
*H04L 69/165* (2022.01)

(52) U.S. Cl.
CPC ......... *H04N 19/164* (2014.11); *H04L 69/165* (2013.01)

(58) Field of Classification Search
CPC ............. H04N 19/164; H04N 21/4331; H04N 21/440281; H04L 69/165; H04L 65/80
See application file for complete search history.

(56) References Cited

U.S. PATENT DOCUMENTS

| | | | | |
|---|---|---|---|---|
| 2002/0052967 A1* | 5/2002 | Goldhor | .................. | G10L 21/04 |
| | | | | 704/E21.017 |
| 2017/0054776 A1* | 2/2017 | Dao | ....................... | H04L 65/752 |

FOREIGN PATENT DOCUMENTS

| | | |
|---|---|---|
| CN | 101115196 A | 1/2008 |
| CN | 103747317 A | 4/2014 |
| CN | 104394486 A | 3/2015 |
| CN | 106385620 A | 2/2017 |
| CN | 107026856 A | 8/2017 |

(Continued)

*Primary Examiner* — Richard T Torrente
(74) *Attorney, Agent, or Firm* — Muncy, Geissler, Olds & Lowe, P.C.

(57) ABSTRACT

An audio/video interaction low-delay transmission method includes the following steps: a driving receiving end maintaining long connection communication with a sending end by means of a TCP, and the receiving end sending a video frame feature to the sending end; sending, by the sending end to the receiving end, a video frame satisfying the video frame feature, and accumulating the number of video frames obtained by the receiving end within a plurality of continuous preset time periods; determining whether the number of video frames obtained within a preset number of preset time periods within the plurality of continuous preset time periods satisfies a preset range, so that a video code rate is adjusted in time to ensure real-time performance and fluency.

6 Claims, 1 Drawing Sheet

(56)　　　　　References Cited

FOREIGN PATENT DOCUMENTS

| CN | 107295286 | A | 10/2017 |
|----|-----------|---|---------|
| CN | 108184166 | A | 6/2018 |
| CN | 110365600 | A | 10/2019 |
| CN | 111107440 | A | 5/2020 |
| CN | 112702649 | A | 4/2021 |
| CN | 113347466 | A | 9/2021 |
| WO | WO2014107946 | A1 | 7/2014 |
| WO | WO2019080022 | A1 | 5/2019 |

* cited by examiner

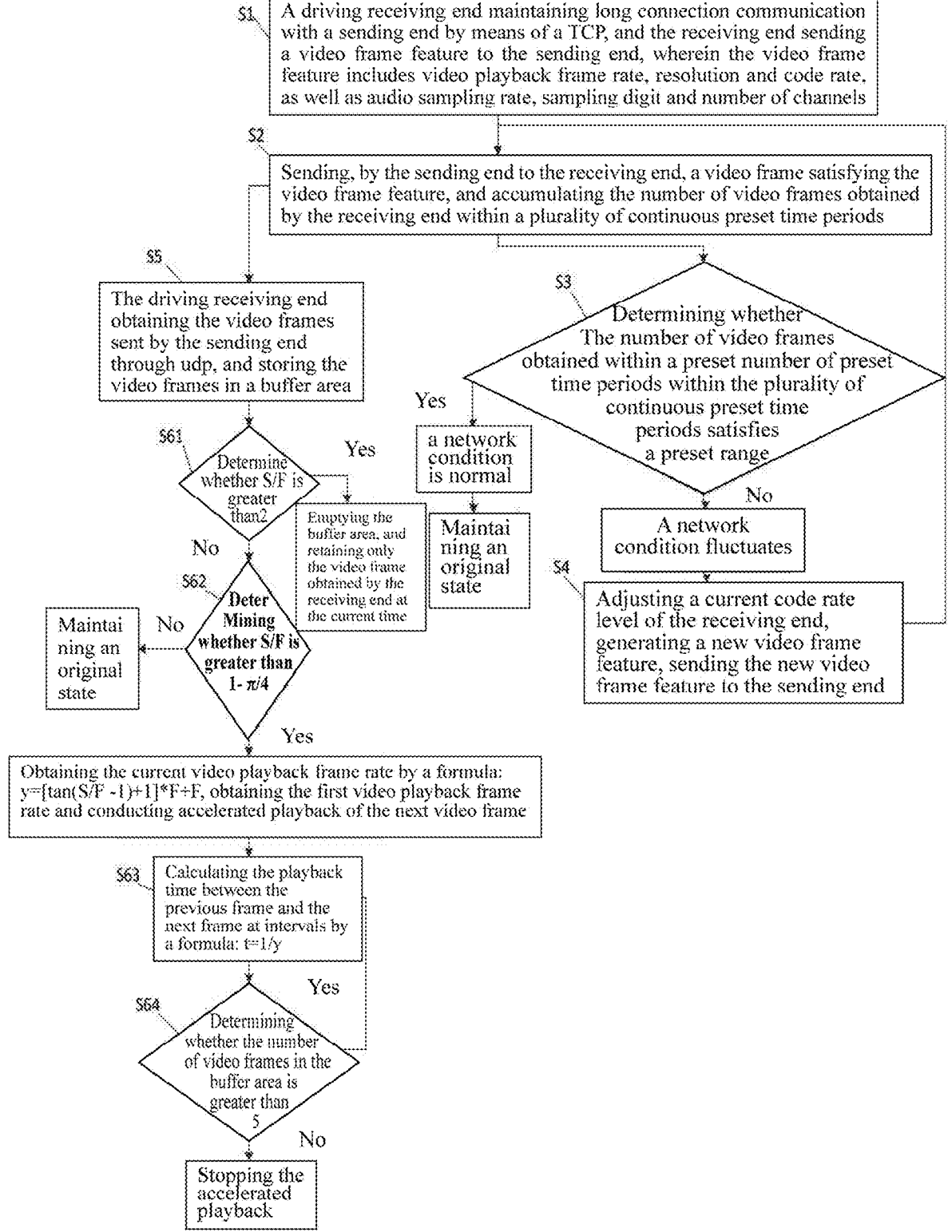

AUDIOVIDEO INTERACTION LOW-DELAY TRANSMISSION METHOD AND BACKGROUND SERVER

CROSS REFERENCE TO RELATED APPLICATIONS

This application is a Continuation of co-pending International Application No. PCT/CN2022/117473, filed on Sep. 7, 2022, for which priority is claimed under 35 U.S.C. § 120; and this application claims priority of Application No. 202210171600.9 filed in China on Feb. 24, 2022 under 35 U.S.C. § 119; the entire contents of all of which are hereby incorporated by reference.

TECHNICAL FIELD

The present application relates to the technical field of audio/video transmission, and particularly relates to an audio/video interaction low-delay transmission method and a background server.

BACKGROUND

In recent years, reform is continually deepened in education, and some key progresses have been made in the field of audio/video. The gap for education is increasing day by day, the demand for online education is increasing day by day, and a large number of related educational interactive products have emerged on the market.

With the application of intelligent interactive systems in daily use, it is becoming more and more urgent to continually improve educational interactive experience for users. The timeliness and fluency of audio/video interaction can better help teachers in education and teaching, and can also ensure the quality of students' listening and answering questions.

At present, corresponding educational interactive products on the market can only realize simple streaming media transmission, but cannot optimize a complex network environment, which is fatal for education industry that has very high requirements for timeliness, fluency and picture quality, and brings great inconvenience and poor experience to the vast number of users.

SUMMARY

To overcome the defects in the prior art, one purpose of the present application is to provide an audio/video interaction low-delay transmission method, which can solve the problem that audio and video with high requirements for timeliness and fluency are easily affected by a complex network environment and affects user experience.

Another purpose of the present application is to provide an audio/video interaction low-delay transmission background server, which can solve the problem that audio and video with high requirements for timeliness and fluency are easily affected by a complex network environment and affects user experience.

To achieve the one of the above purposes, the present application adopts the following technical solution:

An audio/video interaction low-delay transmission method, comprising the following steps:

S1: A driving receiving end maintaining long connection communication with a sending end by means of a TCP, and the receiving end sending a video frame feature to the sending end, wherein the video frame feature includes video playback frame rate, resolution and code rate, as well as audio sampling rate, sampling digit and number of channels;

S2: Sending, by the sending end to the receiving end, a video frame satisfying the video frame feature, and accumulating the number of video frames obtained by the receiving end within a plurality of continuous preset time periods;

S3: Determining whether the number of video frames obtained within a preset number of preset time periods within the plurality of continuous preset time periods satisfies a preset range, if yes, determining that a network condition is normal, and maintaining an original state; and if not, determining that the network condition fluctuates, and performing S4;

S4: Adjusting a current code rate level of the receiving end, generating a new video frame feature, sending the new video frame feature to the sending end, and performing S2.

Preferably, the step S2 is specifically implemented by the following steps:

Sending F video frames per second by the sending end to the receiving end through udp at a video playback frame rate F satisfying the video frame feature, and accumulating the number C of video frames obtained by the receiving end within N continuous 1-second periods;

Preferably, the step S3 is specifically implemented by the following steps:

Determining whether N/2 numbers C are greater than 0.83F, if yes, determining that a network condition is normal; and if not, determining that the network condition is poor, and performing S4;

Preferably, the step S2 is specifically implemented by the following steps:

Sending F video frames per second by the sending end to the receiving end through udp at a video playback frame rate F satisfying the video frame feature, and accumulating the number C of video frames obtained by the receiving end within M continuous 1-second periods, wherein M is greater than N.

Preferably, the step S3 is specifically implemented by the following steps:

Determining whether M/12 numbers C are smaller than 0.83F, if yes, determining that a network condition is good, and performing S4; and if not, determining that the network condition is normal.

Preferably, after the receiving end sending the new video frame feature to the sending end, the method further comprises the following steps:

S5: The driving receiving end obtaining the video frames sent by the sending end through udp, and storing the video frames in a buffer area;

S6: Obtaining the number of current video frames and the video playback frame rate in the buffer area, obtaining a first video playback frame rate by a formula: $y=[\tan(S/F-1)+1]*F+F$, and conducting accelerated playback of a next video frame based on the first video playback frame rate;

Wherein y is a first video playback frame rate, S is the number of current video frames in the buffer area, and F is the current video playback frame rate.

Preferably, the step S6 is specifically implemented by the following steps:

S61: Determining whether S/F is greater than 2, if yes, emptying the buffer area, and retaining only the video frame obtained by the receiving end at the current time; and if not, performing S62;

S62: Determining whether S/F is greater than 1−π/4, if not, maintaining an original state; if yes, obtaining the current video playback frame rate by a formula: y=[tan (S/F−1)+1]*F+F, obtaining the first video playback frame rate and conducting accelerated playback of the next video frame based on the first video playback frame rate; wherein y is the first video playback frame rate, S is the number of current video frames in the buffer area, and F is the current video playback frame rate;

S63: Calculating the playback time between the previous frame and the next frame at intervals by a formula: t=1/y, wherein t is the playback time between the previous frame and the next frame at intervals, and y is the first video playback frame rate;

S64: Determining whether the number of video frames in the buffer area is greater than 5, if yes, performing S63, and if not, stopping the accelerated playback.

To achieve the other of the above purposes, the present application adopts the following technical solution:

An audio/video interaction low-delay transmission background server, comprising a memory and a processor;

The memory is used for storing program instructions;

The processor is used for running the program instructions, so as to implement the audio/video interaction low-delay transmission method.

Compared with the prior art, the present application has the following beneficial effects: the current network condition is determined according to the number of video frames obtained by the receiving end in each preset time period within the plurality of continuous preset time periods, and the video frame feature is adjusted according to the network condition, so that the video frame interaction between the sending end and the receiving end can meet user's requirements for timeliness and fluency; further, an interval suitable for the video playback frame rate and the next frame playback is obtained according to the number of video frames in the buffer area of the receiving end, so as to achieve slightly accelerated video frame playback, optimize user experience, and reduce impact of the complex network environment on audio and video playback.

DESCRIPTION OF DRAWINGS

The sole FIGURE is a flow chart of an audio/video interaction low-delay transmission method of the present application.

DETAILED DESCRIPTION

Preferred embodiments of the present application will be explained below in detail in combination with drawings. It should be understood that the preferred embodiments described below are only used for describing and explaining the present application, but are not used for limiting the present application.

It should be noted in the description of the present application that terms such as "central", "upper", "lower", "left", "right", "vertical", "horizontal", "inner", "outer", etc. indicate direction or position relationships shown based on the drawings, and are only intended to facilitate the description of the present application and the simplification of the description rather than to indicate or imply that the indicated device or element must have a specific direction or constructed and operated in a specific direction, and therefore, shall not be understood as a limitation to the present application. In addition, the terms such as "first", "second" and "third" are only used for the purpose of description, rather than being understood to indicate or imply relative importance.

It should be noted in the explanation of the present application that, unless otherwise specifically regulated and defined, terms such as "installation," "connected," and "connecting" shall be understood in broad sense, and for example, may refer to fixed connection or detachable connection or integral connection, may refer to mechanical connection or electrical connection, and may refer to direct connection or indirect connection through an intermediate medium or inner communication of two elements. For those ordinary skilled in the art, the specific meanings of the above terms in the present application may be understood according to specific conditions.

The present application is further described below in combination with drawings and specific embodiments.

As shown in the sole FIGURE, in the present application, the sending end may be a signal source with a communication function, or a data processing and sending terminal connected with an external signal source, and the receiving end may be a display device with a communication function, or a data processing and receiving terminal connected with an external display device.

Embodiment 1

An audio/video interaction low-delay transmission method, comprising the following steps:

S1: A driving receiving end maintaining long connection communication with a sending end by means of a TCP, and the receiving end sending a video frame feature to the sending end, wherein the video frame feature includes video playback frame rate, resolution and code rate, as well as audio sampling rate, sampling digit and number of channels;

Specifically, the receiving end and the sending end of audio and video maintaining long connection communication through TCP; at the beginning of interaction, the receiving end generating a video frame feature based on the information such as current video playback frame rate, resolution and code rate, as well as audio sampling rate, sampling digit and number of channels, and sending the video frame feature to the sending end.

S2: Sending, by the sending end to the receiving end, a video frame satisfying the video frame feature, and accumulating the number of video frames obtained by the receiving end within a plurality of continuous preset time periods;

Specifically, sending F video frames per second by the sending end to the receiving end through udp at a video playback frame rate F satisfying the video frame feature, and accumulating the number C of video frames obtained by the receiving end within N continuous 1-second periods.

Preferably, sending F video frames per second by the sending end to the receiving end through udp at a video playback frame rate F agreed in the video frame feature, and calculating the number C of video frames received within 10 continuous 1-second periods after the video frames are received by the receiving end.

S3: Determining whether the number of video frames obtained within a preset number of preset time periods within the plurality of continuous preset time periods satisfies a preset range, if yes, determining that a network condition is normal, and maintaining an original state; and if not, determining that the network condition fluctuates, and performing S4;

Specifically, determining whether N/2 numbers C are greater than 0.83F, if yes, determining that a network condition is normal; and if not, determining that the network condition is poor, and performing S4; i.e., if the number C is lower than the frame rate F*0.83 for more than 5 times out of 10 times, determining that network bandwidth is insufficient and congestion is serious;

S4: Adjusting a current code rate level of the driving receiving end, generating a new video frame feature, sending the new video frame feature to the sending end, and performing S2;

Specifically, code rate level can be divided into 8M, 4M, 2M, 1M and 512k; when it is determined that the network condition is normal, maintaining the current state; when it is determined that the network condition is poor, degrading the current code rate level of the driving receiving end by one level, generating a new video frame feature, making the sending end send the video frames to the receiving end at a new frame rate, and performing S2 again, so as to solve the problem of audio and video playback pause caused by network congestion.

Embodiment 2

An audio/video interaction low-delay transmission method, comprising the following steps:

S1: A driving receiving end maintaining long connection communication with a sending end by means of a TCP, and the receiving end sending a video frame feature to the sending end, wherein the video frame feature includes video playback frame rate, resolution and code rate, as well as audio sampling rate, sampling digit and number of channels;

Specifically, the receiving end and the sending end of audio and video maintaining long connection communication through TCP; at the beginning of interaction, the receiving end generating a video frame feature based on the information such as current video playback frame rate, resolution and code rate, as well as audio sampling rate, sampling digit and number of channels, and sending the video frame feature to the sending end.

S2: Sending, by the sending end to the receiving end, a video frame satisfying the video frame feature, and accumulating the number of video frames obtained by the receiving end within a plurality of continuous preset time periods;

Specifically, sending F video frames per second by the sending end to the receiving end through udp at a video playback frame rate F satisfying the video frame feature, and accumulating the number C of video frames obtained by the receiving end within M continuous 1-second periods, wherein M is greater than N.

Preferably, calculating the number C of video frames received in each 1-second period within one minute after the video frames are received by the receiving end, i.e., calculating the number C of video frames received within 60 continuous 1-second periods.

S3: Determining whether the number of video frames obtained within a preset number of preset time periods within the plurality of continuous preset time periods satisfies a preset range, if yes, determining that a network condition is normal, and maintaining an original state; and if not, determining that the network condition fluctuates, and performing S4;

Specifically, determining whether M/12 numbers C are smaller than 0.83F, if yes, determining that a network condition is good, and performing S5; and if not, determining that the network condition is normal.

S4: Adjusting a current code rate level of the receiving end, generating a new video frame feature, sending the new video frame feature to the sending end, and performing S2.

Specifically, when it is determined that the network condition is normal, maintaining the current state; when it is determined that the network condition is good, upgrading the current code rate level of the driving receiving end by one level, generating a new video frame feature, making the sending end send the video frames to the receiving end at a new frame rate, and performing S2 again, so as to solve the problem that the code rate of the video frames becomes higher with the optimization of network speed, and improve the user experience.

Embodiment 3

An audio/video interaction low-delay transmission method, comprising the following steps:

S1: A driving receiving end maintaining long connection communication with a sending end by means of a TCP, and the receiving end sending a video frame feature to the sending end, wherein the video frame feature includes video playback frame rate, resolution and code rate, as well as audio sampling rate, sampling digit and number of channels;

Specifically, the receiving end and the sending end of audio and video maintaining long connection communication through TCP; at the beginning of interaction, the receiving end generating a video frame feature based on the information such as current video playback frame rate, resolution and code rate, as well as audio sampling rate, sampling digit and number of channels, and sending the video frame feature to the sending end.

S2: Sending, by the sending end to the receiving end, a video frame satisfying the video frame feature, and accumulating the number of video frames obtained by the receiving end within a plurality of continuous preset time periods;

Specifically, sending F video frames per second by the sending end to the receiving end through udp at a video playback frame rate F satisfying the video frame feature, and accumulating the number C of video frames obtained by the receiving end within N continuous 1-second periods.

Preferably, sending F video frames per second by the sending end to the receiving end through udp at a video playback frame rate F agreed in the video frame feature, and calculating the number C of video frames received within 10 continuous 1-second periods after the video frames are received by the receiving end.

S3: Determining whether the number of video frames obtained within a preset number of preset time periods within the plurality of continuous preset time periods satisfies a preset range, if yes, determining that a network condition is normal, and maintaining an original state; and if not, determining that the network condition fluctuates, and performing S4;

Specifically, determining whether $N/2$ numbers C are greater than 0.83F, if yes, determining that a network condition is normal; and if not, determining that the network condition is poor, and performing S4; i.e., if the number C is lower than the frame rate F*0.83 for more than 5 times out of 10 times, determining that network bandwidth is insufficient and congestion is serious;

Further, when it is determined that the network condition is normal, maintaining the current state, continuing sending F video frames per second by the sending end to the receiving end through udp at a video playback frame rate F satisfying the video frame feature, and accumulating the number C of video frames obtained by the receiving end within M continuous 1-second periods, wherein M is greater than N. That is, calculating the number C of video frames received in each 1-second period within one minute after the video frames are received by the receiving end, i.e., calculating the number C of video frames received within 60 continuous 1-second periods.

Specifically, determining whether $M/12$ numbers C are smaller than 0.83F, if yes, determining that a network condition is good; and if not, determining that the network condition is normal, and maintaining the current state.

S4: Adjusting a current code rate level of the receiving end, generating a new video frame feature, sending the new video frame feature to the sending end, and performing S2;

Specifically, code rate level can be divided into 8M, 4M, 2M, 1M and 512k; when it is determined that the network condition is poor, degrading the current code rate level of the driving receiving end by one level, generating a new video frame feature, making the sending end send the video frames to the receiving end at a new frame rate, and performing S2 again, so as to solve the problem of audio and video playback pause caused by network congestion.

Specifically, when it is determined that the network condition is good, upgrading the current code rate level of the driving receiving end by one level, generating a new video frame feature, making the sending end send the video frames to the receiving end at a new frame rate, and performing S2 again, so as to solve the problem that the code rate of the video frames becomes higher with the optimization of network speed, and improve the user experience.

In the embodiment, after the receiving end sending the new video frame feature to the sending end, the method further comprises the following steps:

S5: The driving receiving end obtaining the video frames sent by the sending end through udp, and storing the video frames in a buffer area;

Specifically, the sending end and the receiving end realizing TCP connection and conducting video frame interaction through udp, and the receiving end storing the video frames sent by the sending end in the buffer area.

S6: Obtaining the number of current video frames and the video playback frame rate in the buffer area, obtaining a first video playback frame rate by a formula: $y=[\tan(S/F-1)+1]*F+F$, and conducting accelerated playback of a next video frame based on the first video playback frame rate; wherein y is a first video playback frame rate, S is the number of current video frames in the buffer area, and F is the current video playback frame rate.

Specifically, when network pause or fluctuation occurs, the network speed will not be stable, and then the video frames will be obtained by the receiving end in an irregular form; at this time, if a video is played back at the original frame rate, a delay will occur, and it is not able to realize real-time interaction; specifically, the step S6 is specifically implemented by the following steps:

S61: Determining whether $S/F$ is greater than 2, if yes, emptying the buffer area, and retaining only the video frame obtained by the receiving end at the current time; and if not, performing S62;

Specifically, it is inferred based on a formula $y=[\tan(S/F-1)+1]*F+F$ that $\tan(S/F-1)+1$ needs to be greater than 0, so the value range is $(1-\pi/4, \pi/2+1)$. As $S/F$ approaches $\pi/2+1$, S tends to be infinite. Therefore, a limit is 2. When $S/F$ is greater than 2, in order to avoid an excessive acceleration value, the buffer area is emptied, and only the latest video frame is retained.

S62: Determining whether $S/F$ is greater than $1-\pi/4$, if not, maintaining an original state; if yes, obtaining the current video playback frame rate by a formula: $y=[\tan(S/F-1)+1]*F+F$, obtaining the first video playback frame rate and conducting accelerated playback of the next video frame based on the first video playback frame rate; wherein y is the first video playback frame rate, S is the number of current video frames in the buffer area, and F is the current video playback frame rate;

Specifically, when $S/F<1-\pi/4$, maintaining an original state; when $2>S/F>1-\pi/4$, starting an accelerated playback algorithm, and obtaining the first video playback frame rate by a formula: $y=[\tan(S/F-1)+1]*F+F$, so as to conduct accelerated playback of a next video frame based on the first video playback frame rate.

S63: Calculating the playback time between the previous frame and the next frame at intervals by a formula: $t=1/y$, wherein t is the playback time between the previous frame and the next frame at intervals, and y is the first video playback frame rate;

Specifically, after the current video playback frame rate is obtained, obtaining the playback time between the previous frame and the next frame at intervals by a formula: $t=1/y$, so as to conduct accelerated playback of a next video frame according to t.

S64: Determining whether the number of video frames in the buffer area is greater than 5, if yes, performing S63, and if not, stopping the accelerated playback.

Specifically, when the number of video frames in the video buffer area is smaller than 5, stopping the accelerated playback; when the number of video frames in the video buffer area is greater than 5, continuing calculating the playback time between the previous frame and the next frame at intervals by a formula: $t=1/y$, and continuing conducting accelerated playback of a next video frame.

Embodiment 4

An audio/video interaction low-delay transmission background server, comprising a memory and a processor;

The memory is used for storing program instructions; The processor is used for running the program instructions, so as to implement the audio/video interaction low-delay transmission method according to any one of claims 1-3.

For those skilled in the art, various other corresponding changes and modifications can be made according to the technical solution and concept described above, and all these changes and modifications should fall within the protection scope of the claims of the present application.

What is claimed is:

1. An audio/video interaction low-delay transmission method, wherein comprising the following steps:

S1: a driving receiving end maintaining long connection communication with a sending end by means of a transmission control protocol (TCP), and the receiving end sending a video frame feature to the sending end, wherein the video frame feature includes video playback frame rate, resolution and code rate, as well as audio sampling rate, sampling digit and number of channels;

S2: sending, by the sending end to the receiving end, a video frame satisfying the video frame feature, and accumulating a number of video frames obtained by the receiving end within a plurality of continuous preset time periods;

S3: determining whether the number of the video frames obtained within a preset number of preset time periods within the plurality of continuous preset time periods satisfies a preset range, if yes, determining that a network condition is normal, and maintaining an original state; and if not, determining that the network condition fluctuates, and performing S4;

S4: adjusting a current code rate level of the receiving end, generating a new video frame feature, sending the new video frame feature to the sending end, and performing S2;

after the receiving end sending the new video frame feature to the sending end, the method further comprises the following steps:

S5: the driving receiving end obtaining the video frames sent by the sending end through user datagram protocol (UDP), and storing the video frames in a buffer area;

S6: obtaining a current number of the video frames and the video playback frame rate in the buffer area, obtaining a first video playback frame rate by a formula: $y=[\tan (S/F-1)+1]*F+F$, and conducting accelerated playback of a next video frame based on the first video playback frame rate;

where y is a first video playback frame rate, S is the current number of the video frames in the buffer area, and F is a current video playback frame rate;

the step S6 is specifically implemented by the following steps:

S61: determining whether S/F is greater than 2, if yes, emptying the buffer area, and retaining only the video frame obtained by the receiving end at the current time; and if not, performing S62;

S62: determining whether S/F is greater than $1-\pi/4$, if not, maintaining an original state; if yes, obtaining the current video playback frame rate by a formula: $y=[\tan$ $(S/F-1)+1]*F+F$, obtaining the first video playback frame rate and conducting accelerated playback of the next video frame based on the first video playback frame rate; where y is the first video playback frame rate, S is current number of the video frames in the buffer area, and F is the current video playback frame rate;

S63: calculating the playback time between the previous frame and the next frame at intervals by a formula: $t=1/y$, where t is the playback time between the previous frame and the next frame at intervals, and y is the first video playback frame rate;

S64: determining whether the number of the video frames in the buffer area is greater than 5, if not, stopping the accelerated playback.

2. The audio/video interaction low-delay transmission method according to claim 1, wherein the step S2 is specifically implemented by the following steps:

sending F video frames per second by the sending end to the receiving end through user datagram protocol (UDP) at a video playback frame rate F satisfying the video frame feature, and accumulating the number C of video frames obtained by the receiving end within N continuous 1-second periods.

3. The audio/video interaction low-delay transmission method according to claim 2, wherein the step S3 is specifically implemented by the following steps:

determining whether N/2 numbers C are greater than or equal to 0.83F, if yes, determining that a network condition is normal; and if not, determining that the network condition is poor, and performing S4.

4. An audio/video interaction low-delay transmission background server, comprising a memory and a processor;

the memory is used for storing program instructions;

the processor is used for running the program instructions, so as to implement the audio/video interaction low-delay transmission method according to claim 3.

5. An audio/video interaction low-delay transmission background server, comprising a memory and a processor;

the memory is used for storing program instructions;

the processor is used for running the program instructions, so as to implement the audio/video interaction low-delay transmission method according to claim 2.

6. An audio/video interaction low-delay transmission background server, wherein comprising a memory and a processor;

the memory is used for storing program instructions;

the processor is used for running the program instructions, so as to implement the audio/video interaction low-delay transmission method according to claim 1.

* * * * *